United States Patent [19]
Furlani et al.

[11] Patent Number: 6,031,652
[45] Date of Patent: Feb. 29, 2000

[54] BISTABLE LIGHT MODULATOR

[75] Inventors: Edward P. Furlani, Lancaster; Syamal K. Ghosh; Dilip K. Chatterjee, both of Rochester, all of N.Y.

[73] Assignee: Eastman Kodak Company, Rochester, N.Y.

[21] Appl. No.: 09/201,502

[22] Filed: Nov. 30, 1998

[51] Int. Cl.[7] .......................... G02B 26/08; G02B 27/00; G02F 1/09
[52] U.S. Cl. .......................... 359/224; 359/280; 359/281; 359/290; 359/291; 359/295; 359/578; 359/585
[58] Field of Search .................................... 359/224, 280, 359/281, 290, 291, 295, 578, 585

[56] References Cited

U.S. PATENT DOCUMENTS

| | | | |
|---|---|---|---|
| 2,920,529 | 1/1960 | Blythe | 359/291 |
| 5,311,360 | 5/1994 | Bloom et al. | 359/572 |
| 5,677,783 | 10/1997 | Bloom et al. | 359/224 |
| 5,847,859 | 12/1998 | Murata | 359/291 |
| 5,898,515 | 4/1999 | Furlani et al. | 359/291 |
| 5,920,418 | 7/1999 | Shiono et al. | 359/291 |

OTHER PUBLICATIONS

R. H. Victora, C. F. Brucker, and F. E. Spada, "Structure and Micromagnetic Predictions for Hysteretic Phenomena in a Novel Co–Pt Permanent Magnet Thin Film," Dec. 06, 1990, pp. 343–352.

Primary Examiner—Georgia Epps
Assistant Examiner—Evelyn A. Lester
Attorney, Agent, or Firm—Clyde E. Bailey, Sr.

[57] ABSTRACT

A modulator for modulating an incident beam of light includes a substrate having a cavity formed therein and a plurality of spaced-apart deformable elements formed in the cavity. The deformable elements each has a base layer, a poled magnetic layer formed in the base layer and a first light reflection layer deposited on the magnetic layer for reflecting an incident beam of light. Between adjacent deformable elements on the base of the cavity is arranged a second light reflection layer. A conductive element formed in the substrate electro-magnetically energizes the deformable elements to deflect in the cavity. Incident light passing through each one of the first light reflection layers is caused to destructively interfere with light reflected from the second light reflection layers thereby causing modulation of the incident light.

7 Claims, 3 Drawing Sheets

BISTABLE LIGHT MODULATOR

FIELD OF THE INVENTION

This invention relates to an apparatus for modulating a beam of light. More particularly, this invention describes a substantially flat reflective surface having selectively deformable elements for providing a diffraction grating.

BACKGROUND OF THE INVENTION

Advances in micromachining technology have given rise to a variety of Micro-electromechanical systems (MEMS) including light modulators for low cost display applications. Such modulators provide high-resolution, high operating speeds (KHz frame rates), multiple gray scale levels, color adaptability, high contrast ratio, and compatibility with VLSI technology. One such modulator has been disclosed in U.S. Pat. No. 5,311,360, titled "Method and Apparatus for Modulating a Light Beam" issued May 10, 1994, by Bloom et al. This modulator is a micromachined reflective phase grating. It consists of a plurality of equally spaced deformable elements in the form of beams suspended at both ends above a substrate thereby forming a grating. The deformable elements have a metallic layer that serves both as an electrode and as reflective surface for incident light. The substrate is also reflective and contains a separate electrode. The deformable elements are designed to have a thickness equal to $\lambda/4$ where $\lambda$ is the wavelength of the incident light source. They are supported a distance of $\lambda/4$ above, and parallel to, the substrate. Thus, when the deformable elements are unactivated, i.e., undeflected, the distance between their top surface and the substrate equals $\lambda/2$. Thus, when light impinges perpendicularly to the surface of this surface the grating reflects light as a flat mirror. However, when a sufficient voltage (switching voltage) is applied between the deformable elements and the substrate, the resulting electrostatic force pulls a portion of the deformable elements down a distance $\lambda/4$ toward the substrate, thereby reducing the distance between the top of this portion of the elements and the substrate to $\lambda/4$. Thus, light reflected from this portion of the deformable elements is out of phase with that from the substrate and a diffraction pattern is formed. Optical systems can intercept the diffracted light with output occurring only when the deformable elements are activated (i.e., pulled down). For display applications, a number of deformable elements are grouped for simultaneous activation thereby defining a pixel, and arrays of such pixels are used to form an image.

U.S. Pat. No. 5,677,783 titled "Method of Making a Deformable Grating Apparatus for Modulating a Light Beam and Including Means for Obviating Stiction Between Grating Elements and Underlying Substrate," issued Oct. 14, 1997, by Bloom et al. discloses a modulator which obviates stiction between grating elements and underlying substrate. One problem with the prior art modulator is that it is activated via an electrostatic force which is nonlinear. Specifically, as the voltage applied to the modulator increases from zero, the activated deformable elements deflect incrementally until they reach approximately ⅓ of their full scale deflection, and then they jump the remaining distance until they impact the substrate. Therefore, when the prior art modulator modulates light, the activated deformable elements contact the substrate and this gives rise to significant stiction problems.

Therefore, a need exists for a modulator in which the deformable elements can be held stationary at any point over the entire range of their motion so that light modulation can occur without the deformable elements contacting the substrate thereby eliminating the stiction problem.

SUMMARY OF THE INVENTION

It is, therefore, an object of the present invention to provide a modulator for modulating an incident beam of light by providing a deformable structure which can effectively move the desired $\lambda/4$ distance.

The object is achieved in a modulator for modulating an incident beam of light, comprising:

a substrate comprising a cavity having a base and side walls surrounding said base, wherein said base comprises at least one ferromagnetic element arranged substantially lengthwise therein;

a plurality of equally spaced apart, deformable elements suspended above said cavity in a first position, each one of said deformable elements having opposing end edges integrally formed in said side walls of said substrate just above said cavity, wherein each one of said plurality of deformable elements comprises a base layer having a recess, a poled magnetic layer disposed in said recess, and a first light reflection layer deposited on said magnetic layer for reflecting said incident beam of light;

at least one conductive element arranged substantially lengthwise in one of said side walls surrounding said cavity in an electromagnetic relationship to said magnetic layer of said plurality of equally spaced apart deformable elements;

a plurality of second light reflection layers arranged on the base of said cavity, a single one of said plurality of second light reflection layers being arranged between nearest adjacent spaced apart deformable elements; and means for applying a current through said conductive element, said current producing a magnetic field in the deformable element which causes said deformable elements to deflect to a second position towards said ferromagnetic element in said cavity such that each one of said poled magnetic layers in said plurality of deformable elements induces poles in said ferromagnetic element thereby producing an attractive magnetic force between said magnetic layer and said ferromagnetic element, said attractive magnetic force holding said plurality of deformable elements in said second position such that light reflecting from said plurality of first light reflection layers destructively interferes with light reflected from said plurality of second light reflection layers thereby causing modulation of said incident light.

An advantage of the light modulator of the invention is that its deformable elements can be deflected over the entire range of their possible motion thereby accommodating a range of incident wavelengths.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
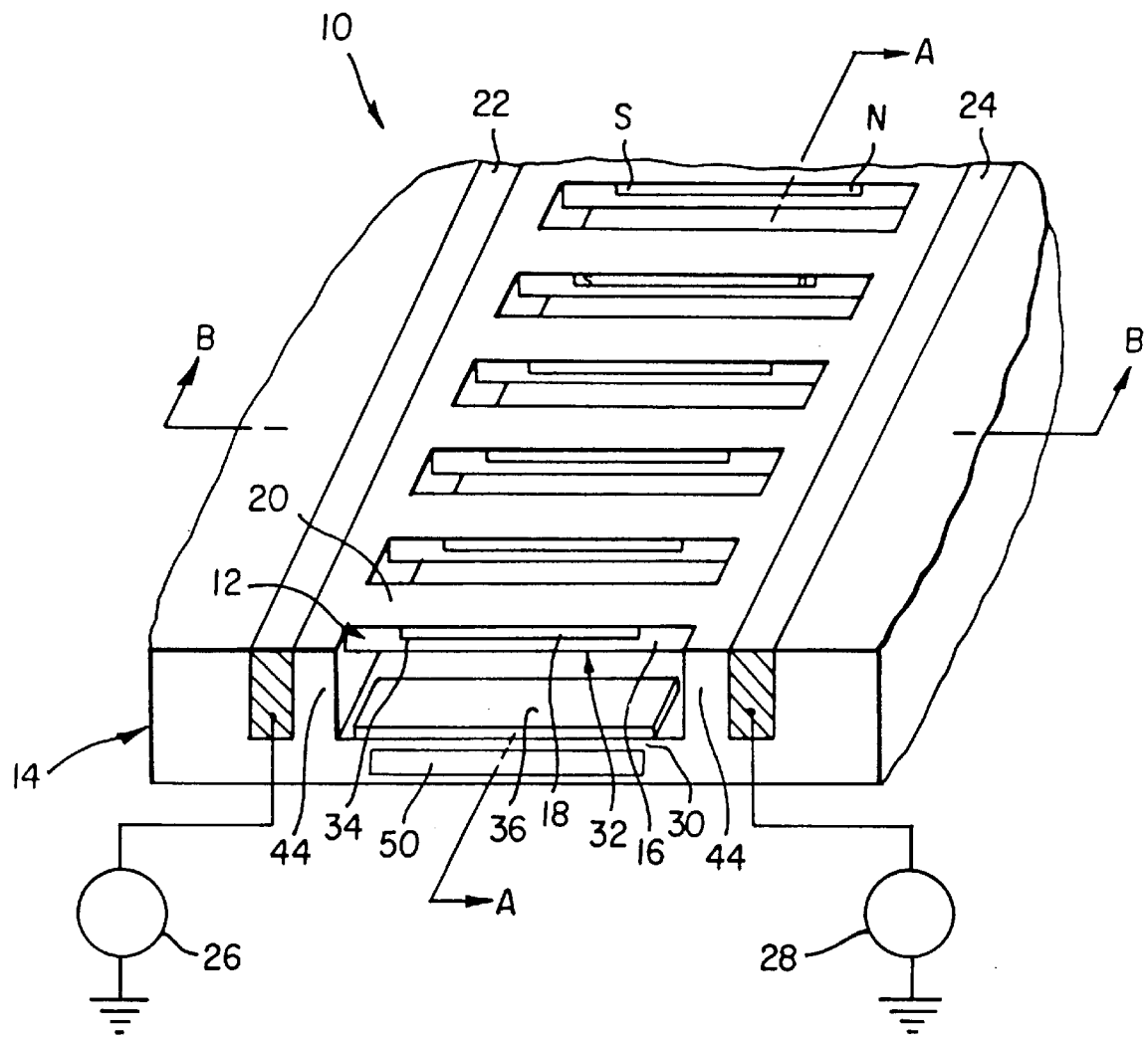
FIG. 1 is a perspective, partially cut-away view of a modulator of the invention.
Figure 2:
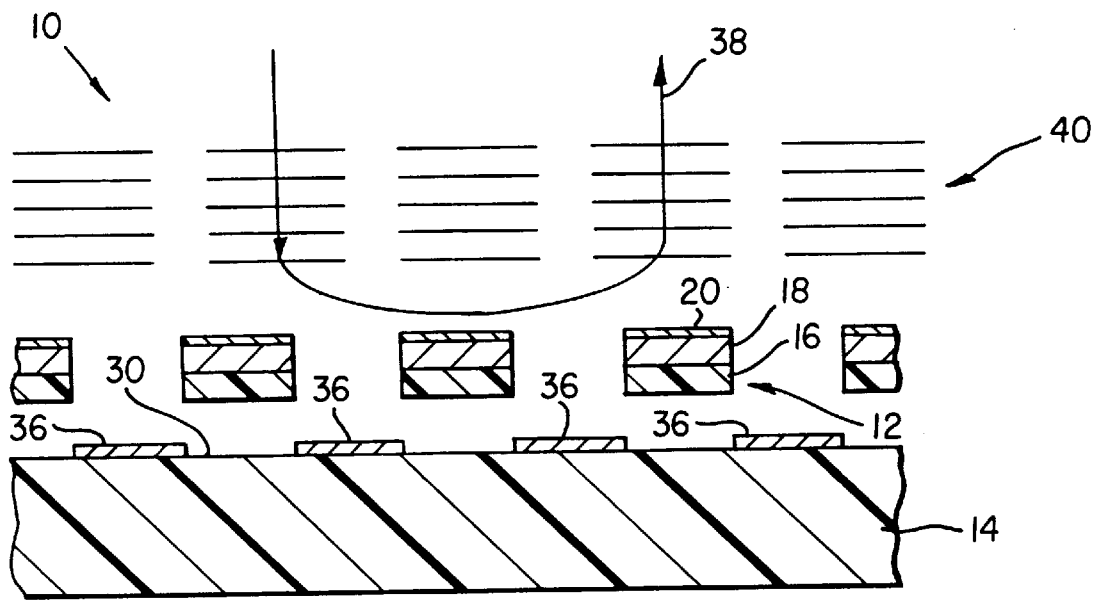
FIG. 2 is a sectional view of the modulator of FIG. 1 taken along line A—A of FIG. 1 wherein the deformable elements are in the up position.
Figure 3:
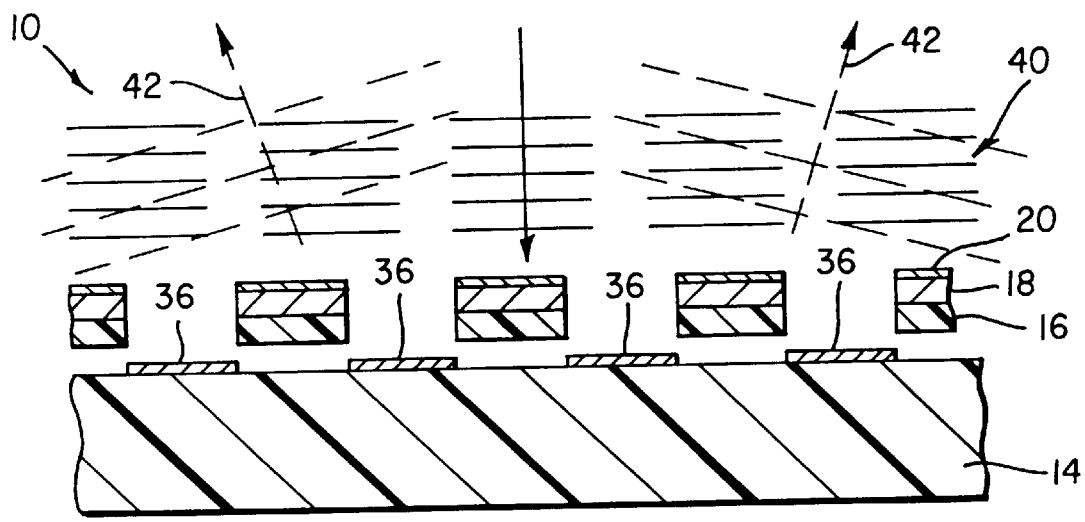
FIG. 3 is a sectional view of the modulator of FIG. 1 taken along line A—A of FIG. 1 wherein the deformable elements are in the down position.

Referring to FIGS. 1, 2, and 3, perspective, partially cut-away, and sectional views of a light modulator 10 of the invention are shown. The light modulator 10 comprises a plurality of equally spaced deformable elements 12 in the form of beams. The substrate 14 has a cavity 32 that has a base 30 and side walls 44, and the deformable elements 12 are supported at both ends above the cavity 32 with both ends integrally formed in the side walls 44. The deformable elements 12 comprise a base layer 16, preferably silicon nitride, having a recess 34, a layer of hard magnetic material 18 is deposited in the recess 34, and a first light reflection layer 20, preferably aluminum, is deposited on the top of the layer 18 of hard magnetic material, as shown. The layer 18 of hard magnetic material is preferably made from cobalt-platinum (Co-Pt) which is deposited for in plane polarization at room temperature using dc or rf magnetron sputtering as described in the publication entitled "Structure and Micromagnetic Predictions for Hysteretic Phenomena in a Novel Co-Pt Permanent Magnetic Thin Film," by R. H. Victora, et al. in Journal of Magnetism and Magnetic Materials, Vol. 97, 1991, pp. 343–352. The layer of hard magnetic material 18 is polarized along its length (see FIG. 4).

There are conductive elements 22 and 24 arranged in the side walls 44 on substrate 14 in proximity to the plurality of deformable elements 12 as shown. The conductive elements 22 and 24 are connected to power sources 26 and 28, respectively. There is a plurality of second light reflection layers 36, one each being arranged on the base 30 of the cavity 32 between the spaced apart deformable elements 12 as shown. In addition, ferromagnetic element 50 is arranged in the substrate 14 beneath the base 30 of cavity 32 as shown. The ferromagnetic element 50 runs the length of the substrate, and is centered below the south and north poles of the layer 18 of hard magnetic material on the plurality of deformable elements 12. The ferromagnetic element 50 is preferably made of soft magnetic materials including permalloy, supermalloy, sendust, iron, nickel, nickel-iron, or alloys thereof.

In FIG. 2 the modulator 10 is shown in a sectional view taken along line A—A of FIG. 1. The modulator 10 is shown with the power sources 26 and 28 off so that there is no current flowing through conductive elements 22 and 24. When no current flows through conductive elements 22 and 24, the deformable elements 12 are flat (i.e., in an up position) due to the inherent residual tensile stress therein. The modulator is designed so that when a light wave 40 of wavelength λ impinges perpendicularly to the surface of the modulator 10, the light reflected from the first light reflection layer 20 on the deformable elements 12 is in phase with the light reflected from the plurality of second light reflection layers 36 on the base 30 of the cavity 32 between the deformable elements 12 and consequently, the modulator 10 reflects light as a flat mirror as indicated by arrow 38.

In FIG. 3 the modulator 10 is shown in a sectional view taken along line A—A of FIG. 1. The power sources 26 and 28 are turned on thereby causing currents to flow in conductive elements 22 and 24 as will be described. The applied currents gives rise to magnetic fields that impart a Lorentz force to the magnetic poles in the layer of hard magnetic material 18 in the deformable elements 12 which is sufficient to bend the deformable elements 12 downward until the midportion of the deformable elements 12 deflects a distance λ/4 downward (see FIG. 6). Thus, when a lightwave 40 of wavelength λ impinges perpendicularly to the surface of the modulator 10, the light reflected from the first light reflection layer 20 on the deformable elements 12 is out of phase with the light reflected from the plurality of second light reflection layers 36 on the base 30 of the cavity 32 between the deformable elements 12 and the modulator 10 diffracts the incident light in directions indicated by arrows 42. Optical systems can be designed to intercept the diffracted light with output occurring only when the deformable elements 12 are activated. For display applications, a group of deformable elements 12 can be simultaneously activated to form a pixel, and arrays of such pixels can be fabricated for displaying an image.

Figure 4:
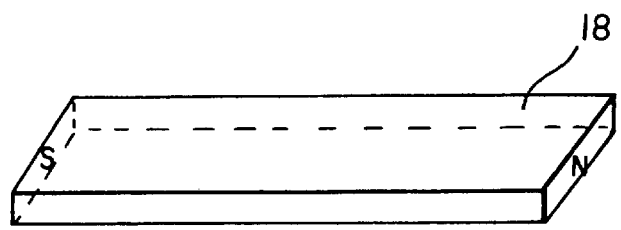
FIG. 4 is a perspective view of a layer of hard magnetic material which has been polarized along its length.

Referring to FIG. 4, a perspective view is shown of a polarized layer 18 of hard magnetic material in isolation. As shown in FIG. 1, magnetic layer 18 comprising this hard magnetic material is disposed in recess 34 of each one of the deformable elements 12.

Figure 5:
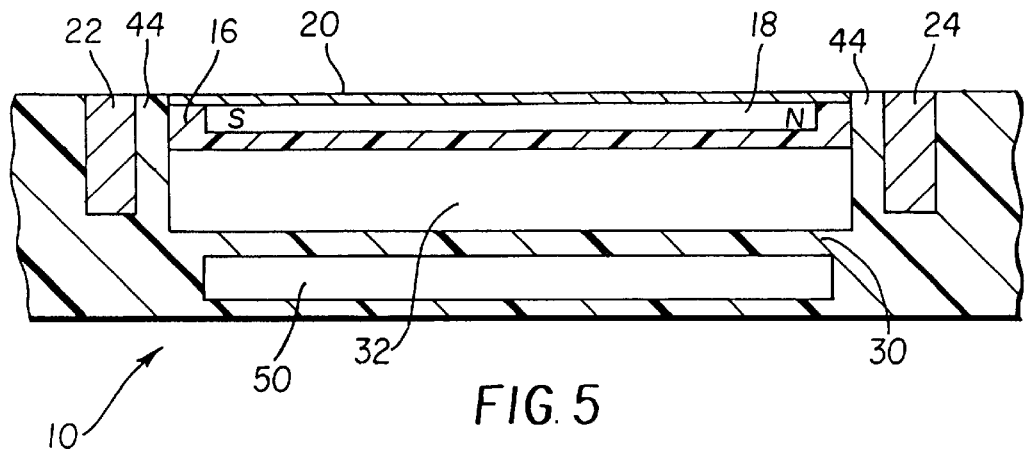
FIG. 5 is a sectional view of the modulator of FIG. 1 taken along line B—B of FIG. 1 wherein the deformable elements are in the up position.

Referring to FIG. 5, a sectional view is shown of the modulator 10 taken along line B—B of FIG. 1, wherein the deformable elements 12 are in an unactivated up position (i.e., power sources 26 and 28 are off).

Figure 6:
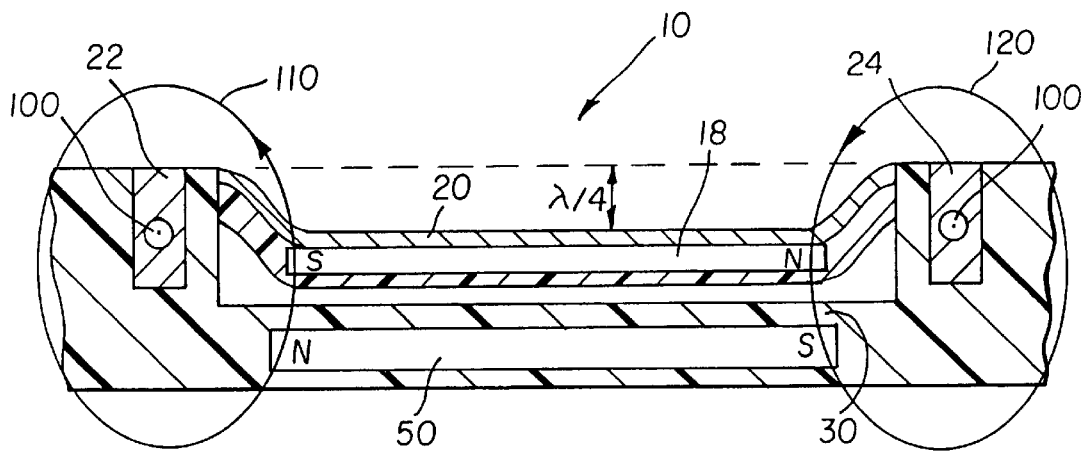
FIG. 6 is a sectional view of the modulator of FIG. 1 taken along line B—B of FIG. 1 wherein the deformable elements are being displaced to the down position via an applied current.

Referring to FIG. 6, a sectional view is shown of the modulator 10 taken along line B—B of FIG. 1, wherein the deformable elements 12 are in an activated down position, i.e., power sources 26 and 28 are turned on. Specifically, to activate the deformable elements 12, the power sources 26 and 28 cause currents to flow through conductive elements 22 and 24 in a direction out of the paper as indicated by current arrows tips 100 as is well known. The current flowing through the conductive element 22 gives rise to a magnetic field indicated by field line 110 which imparts a downward Lorentz force to the south pole of the layer of hard magnetic material 18. The current flowing through the conductive element 24 gives rise to a magnetic field indicated by field line 120 which imparts a downward Lorentz force to the north pole of the layer of hard magnetic material 18. The currents in conductive elements 22 and 24 are of sufficient magnitude to deflect the midportion of the deformable elements 12 downward a distance λ/4 as shown. It is instructive to note that the modulator will modulate light if the deformable elements 12 are deflected any odd multiple λ/4 i.e., 3λ/4, 5λ/4, 7λ/4, etc. It should also be noted that the ferromagnetic element 50 aids in pulling down the plurality of deformable elements 12 due to the mutual magnetic attraction of the south and north poles of the layer 18 of hard magnetic material in the plurality of deformable elements 12. It is important to note that the activated deformable elements 12 obtain λ/4 the desired deflection over a limited portion of their midsection due to the fact that deformable elements 12 are rigidly supported at both ends. When a lightwave 40 of wavelength λ impinges perpendicularly to the surface of the modulator 10 when the deformable elements 12 are activated in this fashion, the light reflected from the first light reflection layer 20 on the midportion of the deformable elements 12 that is deflected downward a distance λ/4 is in out of phase with the light reflected from the plurality of second light reflection layers 36 on the base 30 in the cavity 32 between the deformable elements 12, and the modulator 10 diffracts the incident light as described above.

Figure 7:
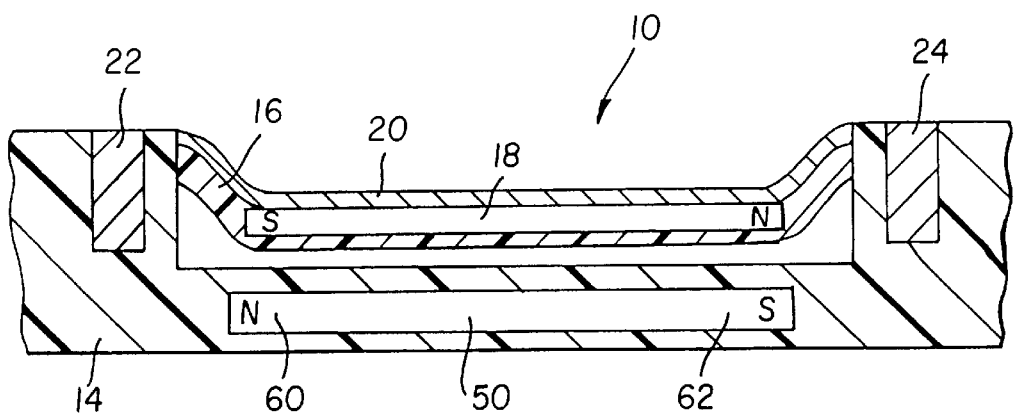
FIG. 7 is a sectional view of the modulator of FIG. 1 taken along line B—B of FIG. 1 wherein the deformable elements are held in the down position with no applied current.

Referring to FIG.7, a sectional view is shown of the modulator 10 taken along line B—B of FIG. 1 wherein the deformable elements 12 are in an unactivated down position, i.e., power sources 26 and 28 are turned off. The deformable elements are held in the down position due to the force of attraction between the south and north poles of the layer 18 of hard magnetic material and the ferromagnetic element 50. Specifically, the south pole of the layer 18 of hard magnetic material induces a north surface pole 60 in the ferromagnetic element 50 which, in turn, imparts a downward force to the south pole of the layer 18 of hard magnetic material. Similarly, the north pole of the layer 18 of hard magnetic material induces a south surface pole 62 in the ferromagnetic element 50 which, in turn imparts a downward force to the south pole of the layer 18 of hard magnetic material. These forces hold the plurality of deformable elements 12 in the down position even when no current flows through the conductive elements 22 and 24. Thus the modulator 10 will continue to modulate light as described above when the deformable elements 12 are held down in this fashion even though it consumes no energy.

The invention has been described in detail with particular reference to certain preferred embodiments thereof, but it will be understood that variations and modifications can be effected within the spirit and scope of the invention.

PARTS LIST 10 light modulator
12 deformable element
14 substrate
16 base layer
18 layer of hard magnetic material
20 first light reflection layer
22 conductive element
24 conductive element
26 power source
28 power source
30 base of cavity
32 cavity
34 recess
36 second light reflection layer
38 light direction arrow
40 light wave
42 light direction arrow
44 side walls
50 ferromagnetic element
60 north surface pole
62 south surface pole
100 tip of current arrow
110 magnetic field line
120 magnetic field line

What is claimed is:

1. A modulator for modulating an incident beam of light, comprising:

a substrate comprising a cavity having a base and side walls surrounding said base, wherein said base comprises at least one ferromagnetic element arranged substantially lengthwise therein;

a plurality of equally spaced apart, deformable elements suspended above said cavity in a first position, each one of said deformable elements having opposing end edges integrally formed in said side walls of said substrate just above said cavity, wherein each one of said plurality of deformable elements comprises a base layer having a recess, a poled magnetic layer disposed in said recess, and a first light reflection layer deposited on said magnetic layer for reflecting said incident beam of light;

at least one conductive element arranged substantially lengthwise in one of said side walls surrounding said cavity in an electromagnetic relationship to said magnetic layer of said plurality of equally spaced apart deformable elements;

a plurality of second light reflection layers arranged on the base of said cavity, a single one of said plurality of second light reflection layers being arranged between nearest adjacent spaced apart deformable elements; and means for applying a current through said conductive element, said current producing a magnetic field in the deformable element which causes said deformable elements to deflect to a second position towards said ferromagnetic element in said cavity such that each one of said poled magnetic layers in said plurality of deformable elements induces poles in said ferromagnetic element thereby producing an attractive magnetic force between said magnetic layer and said ferromagnetic element, said attractive magnetic force holding said plurality of deformable elements in said second position such that light reflecting from said plurality of first light reflection layers destructively interferes with light reflected from said plurality of second light reflection layers thereby causing modulation of said incident light.

2. The modulator of claim 1 wherein said first reflection layer comprises materials selected from the group consisting of: (a) aluminum, (b) copper, (c) gold, (d) silver, and, (e) alloys thereof.

3. The modulator of claim 1 wherein said conductive element comprises materials selected from the group consisting of (a) aluminum, (b) copper, (c) gold, (d) silver, and, (e) alloys thereof.

4. The modulator of claim 1 wherein said poled magnetic layer is made from cobalt-platinum.

5. The modulator of claim 1 wherein said base layer is made from silicon dioxide.

6. The modulator of claim 1 wherein said base layer is made from silicon nitride.

7. The modulator of claim 1 wherein said ferromagnetic element is made of soft magnetic materials selected from the group consisting of: permalloy, supermalloy, sendust, iron, nickel, nickel-iron or alloys thereof.

* * * * *